UNITED STATES PATENT OFFICE.

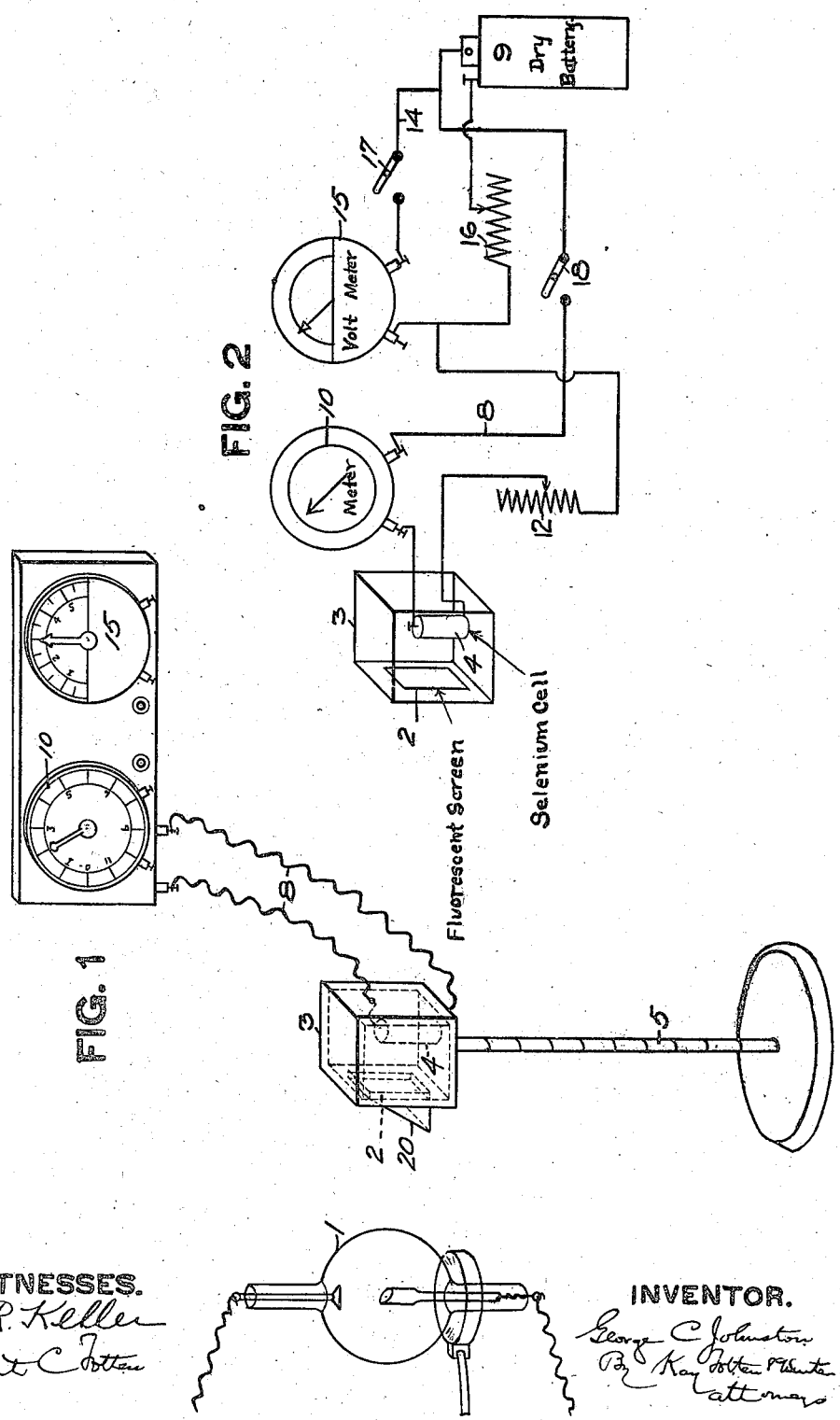

GEORGE C. JOHNSTON, OF PITTSBURG, PENNSYLVANIA.

X-RAY METER.

No. 893,244.

Specification of Letters Patent.

Patented July 14, 1908.

Application filed June 30, 1906. Serial No. 324,275.

*To all whom it may concern:*

Be it known that I, GEORGE C. JOHNSTON, a resident of Pittsburg, in the county of Allegheny and State of Pennsylvania, have invented a new and useful Improvement in X-Ray Meters; and I do hereby declare the following to be a full, clear, and exact description thereof.

This invention is for apparatus for measuring the quantity or intensity of radiant energy, such as the so-called Roentgen or X-rays.

The object of the invention is to provide apparatus for this purpose in which the quantity or intensity of the radiant energy can be obtained from a direct reading given by a pointer moving over a graduated scale, thus giving an instantaneous reading, and without the necessity of calculations or analyses, as has heretofore been necessary.

In the accompanying drawings Figure 1 is a perspective diagram of my apparatus; Fig. 2 is a diagram of the electric circuits.

Attempts have been made to devise means whereby an accurate measurement of the quality and quantity of the invisible radiations known as X-rays might be measured. All prior devices of this kind either required calculations to be made from the different readings in order to obtain the true reading; or the intensity of the ray was measured by its effect upon certain chemical compositions, the measurement depending upon a comparison of a change of color resulting in certain salts when exposed to the ray, with an arbitrary color scale. This offers a wide latitude for error. Estimations of the penetrating power of the rays have also been made by holding in the path of the rays various objects, usually the hand of the observer, and this practice is responsible for serious physical injuries, but as it is the best way of actually determining the quality and quantity of the invisible radiations, it is widely followed. In place of the observer's hand, various other objects possessing a certain degree of opacity to the X-rays have been used. The readings so obtained are inaccurate, since they are required to be made in the dark, and the observer's eyes must be accustomed to the darkness; hence their accuracy depends upon the condition of the observer's eyes at the time the reading is made, and no two observers read the same degree of penetration.

It is well known that X-rays have the property of rendering luminous or fluorescent certain salts, such as tungstate of calcium, barium platino cyanid, and others, so that if these salts are observed in darkness under the action of the X-rays they become brilliantly luminous, and the luminosity bears a constant ratio to the intensity of the rays, and the distance from the point of emission of the rays, since such rays, as common with all forms of wave length emitted from a point, decrease as the square of the distance. It has been customary since this discovery to judge of the amount and intensity of the X-rays emitted from the tube by observing the intensity of the fluorescence produced on such salts by means of a primitive device known as a fluoroscope. The accuracy of this measurement, however, as in the other case, depends entirely upon the condition of the eyes of the observer. In carrying out my invention, I make use of this discovery that X-rays produce fluorescence in certain salts, in connection with a further well known scientific fact that the ohmic resistance of a selenium cell is directly in proportion to the intensity of the light to which said cell is exposed. What I measure is the quantity and intensity of the rays which have the power of rendering fluorescent the salts specified. These rays are the so-called X-rays or Roentgen rays, and while there are undoubtedly many other forms of radiant energy emitted by the tube, still it is sufficient for practical purposes to be able to measure accurately, continuously, and safely the X-rays, which are the principal emanations from the tube.

In carrying out my invention, I make use of apparatus such as shown in the accompanying drawing, in which the X-ray tube is shown at 1; the fluorescent screen of tungstate of calcium, or similar material at 2, and in suitable proximity to the X-ray tube to receive the emanations from the latter. This fluorescent material may either be placed in a light impervious container, or box 3, or may be used as a screen to cover an opening in said box, as shown. Contained in the light-tight box and facing the screen 2 is the selenium cell 4, the whole being mounted upon a suitable support or stand 5, so that it can be placed at the necessary fixed or uniform distance from the X-ray tube.

The selenium cell 4, as is well known, has the property of changing its ohmic resistance to the passage of electric current with variation of light to which it is exposed. In total darkness such a cell may have a resistance of several hundred ohms, yet upon permitting light, either natural or artificial, reflected or direct, or the result of phosphorescence or fluorescence, to strike said cell, its ohmic resistance falls almost instantly to a great degree, and the variation in its ohmic resistance thus produced bears a direct relation to the intensity of the light. In my arrangement this selenium cell faces the fluorescent material 2, and since the latter becomes fluorescent under the emanations of the X-ray tube, and such fluorescence is in direct ratio to the intensity of these emanations, it is at once obvious that the resistance of the selenium cell varies directly as the intensity of the emanations from the tube. If, therefore, we measure the change of ohmic resistance of the selenium cell, we get a direct measurement of the intensity of certain emanations from the tube.

Various forms of apparatus may be used for measuring the variations of ohmic resistance of the selenium cell. For this purpose I connect said cell in an electric circuit 8, containing a suitable source of power, such as the battery 9, and also connect in said circuit a suitable instrument for measuring the current in the circuit, such as a galvanometer 10, having a pointer traveling over a graduated scale. It is obvious that the light-tight box containing the selenium cell may be placed at any desired distance from the remainder of the apparatus. In making these measurements, it is of course necessary that the same conditions exist at each reading, both as to strength of current in the circuit 8, and the condition of the selenium cell 4, which may be affected by external light conditions, or other causes. In order to secure accuracy, it is therefore necessary to have proper adjusting and balancing devices or resistances in the circuits. I therefore place in the circuit in series with the selenium cell and galvanometer or meter 10, a suitable variable resistance, or rheostat 12, by means of which more or less ohmic resistance can be placed in the circuit, so that by proper adjustment of this, a point is reached in which the ohmic resistance of this rheostat, the connecting wires, the measuring instrument 10, and the selenium cell 4 when in darkness, exactly balances the electro-force on the circuit. Consequently no current will pass the measuring instrument or galvanometer, and the pointer of the latter will stand at zero. It is further necessary that the current be the same for each reading. Inasmuch as no known source of current is absolutely constant, I have provided a battery testing circuit 14, in which is placed a volt meter 15, and a variable resistance or rheostat 16, the latter also being in the circuit 8. By means of the latter, enough ohmic resistance can be put in the circuit to get a fixed uniform reading, say 2 volts on the volt meter 15 at each use of the apparatus. In this battery circuit is placed a suitable switch 17, by the closing of which a reading or testing of the battery can be quickly obtained, and the variable resistance 16 adjusted to bring the current from the battery down to a fixed uniform value. The circuit 8 is also provided with a suitable switch 18, which preferably will be operated pneumatically so that it can be instantly opened and closed.

In the use of the apparatus described, the battery is first tested by closing the switch 17, and the rheostat 16 is adjusted until the fixed uniform current value is reached. Then the switch 18 is closed, and the rheostat 12 adjusted until the resistance of said rheostat, the connecting wires, the meter 10, and the selenium cell practically balance the electro motive force of the battery 9, or at least sufficiently to reduce the current in the circuit to such an extent that it will produce no effect on the meter 10. Consequently the pointer of said meter will stand at zero. The fluorescent screen 2 is then exposed to the emanations of the X-ray tube at a uniform or fixed distance. The effect of the X-rays is to render said fluorescent material luminous, thus illuminating the interior of the light-tight container 3, and reducing the ohmic resistance of the selenium cell 4. This reduces the ohmic resistance in the circuit 8, destroys the balance and permits a current to flow through the meter 10, the quantity of which is indicated by the hand on the graduated scale. Inasmuch as the degree of fluorescence is directly proportional to the intensity of the X-rays, and the decrease in ohmic resistance of the selenium cell is in direct ratio to the intensity of light thrown thereon from the fluorescent screen, it is at once obvious that the reading on the meter 10 indicates accurately the intensity and quantity of the X-rays. This reading is obtained instantly, without calculations or analyses, without any personal equations whatsoever, and in a manner not to expose the observer to physical discomforts or injury.

All X-ray tubes emit rays of various degrees of penetration. A tube of high efficiency emits rays which are mostly of high penetrating power and only a few of low penetrating power, while in a tube of low efficiency the reverse is true. Since only the rays of high penetration are of value, and since both kinds produce equal luminosity of the fluorescent screen, provision is made to cut off or filter out the rays of low penetration. This I accomplish by placing in the path of the rays a screen 20 of aluminum or other substance which is relatively opaque to X-rays. The effect of this screen is to cut off the rays of low penetration. Preferably this screen is of wedge shape, or concave, or convex, or other shape having different portions of different thicknesses, so that a portion of the rays of low penetration may pass in order to get some reading from tubes of extremely low efficiency. The effect of the graduated screen is to give a graded reading, and one of greater delicacy at the lower end of the scale.

It is obvious that in place of having the fluorescent material in the form of a screen in the light-tight box 3, said material may be placed directly in said box, the latter being formed of some material which is impervious to external light, but is pervious to X-rays.

What I claim is:

1. Apparatus for measuring radiant energy, comprising an electric circuit having therein a meter and a selenium cell, and fluorescent material arranged to cast its light on said cell.

2. Apparatus for measuring radiant energy, comprising material which becomes fluorescent under the action of the radiant energy, a selenium cell protected from external light and arranged to be acted on by the fluorescence of said material, and means for measuring the resistance of said selenium cell.

3. Apparatus for measuring radiant energy, comprising material which becomes luminous under the action of the radiant energy, a selenium cell in position to be acted on by the fluorescent material, a light impervious container for said cell, an electric circuit in which said cell is placed, and a meter in said circuit.

4. Apparatus for measuring radiant energy, comprising material which becomes fluorescent under the action of the radiant energy, and means for measuring the degree of said fluorescence.

5. Apparatus for measuring radiant energy, comprising material which becomes fluorescent under the action of said energy, and light measuring apparatus.

6. Apparatus for measuring radiant energy, comprising material which becomes fluorescent under the action of said radiant energy, means for measuring the degree of said fluorescence, and means protecting the fluorescent material from rays of low penetration.

7. Apparatus for measuring radiant energy, comprising fluorescent material, a graduated screen of relatively radiant opaque material in front of the fluorescent material, a selenium cell, and means for measuring the resistance of said cell.

8. Apparatus for measuring radiant energy, comprising material which becomes fluorescent under the action of said radiant energy, a selenium cell, means for measuring the resistance of said cell, and a relatively radiant-opaque screen in front of the fluorescent material.

9. Apparatus for measuring radiant energy, comprising a selenium cell, fluorescent material, a light impervious container for said cell and material, an electric circuit containing said cell, a source of energy, a meter and a rheostat, a volt meter in circuit with the source of energy, and a rheostat in said volt meter circuit.

In testimony whereof, I the said GEORGE C. JOHNSTON have hereunto set my hand.

GEORGE C. JOHNSTON.

Witnesses:
F. W. WINTER,
ROBERT C. TOTTEN.